(12) United States Patent
Su et al.

(10) Patent No.: US 11,306,893 B2
(45) Date of Patent: Apr. 19, 2022

(54) DISPLAY DEVICE BACKLIGHT MODULE WITH LENSES HAVING SUPPORTING PORTIONS FOR DIFFUSER BOARD

(71) Applicant: Huizhou China Star Optoelectronics Technology Co., Ltd., Huizhou (CN)

(72) Inventors: Zanjia Su, Huizhou (CN); Gang Yu, Huizhou (CN); Yongyuan Qiu, Huizhou (CN); Jianyu Chang, Huizhou (CN); Linlin Fu, Huizhou (CN); Zhuping Luo, Huizhou (CN)

(73) Assignee: Huizhou China Star Optoelectronics Technology Co., Ltd., Huizhou (CN)

( * ) Notice: Subject to any disclaimer, the term of this patent is extended or adjusted under 35 U.S.C. 154(b) by 0 days.

(21) Appl. No.: 16/605,565

(22) PCT Filed: May 21, 2019

(86) PCT No.: PCT/CN2019/087777
§ 371 (c)(1),
(2) Date: Oct. 16, 2019

(87) PCT Pub. No.: WO2020/224008
PCT Pub. Date: Nov. 12, 2020

(65) Prior Publication Data
US 2022/0049834 A1  Feb. 17, 2022

(30) Foreign Application Priority Data
May 8, 2019 (CN) .......................... 201910380118.4

(51) Int. Cl.
*G02F 1/13357* (2006.01)
*F21V 5/00* (2018.01)
(Continued)

(52) U.S. Cl.
CPC ............... *F21V 5/007* (2013.01); *F21V 7/00* (2013.01); *F21Y 2115/10* (2016.08)

(58) Field of Classification Search
CPC ......... G02F 1/133603; G02F 1/133606; G02F 1/133607; G09F 13/0409; F21V 5/007; F21V 5/048; F21Y 2105/10
See application file for complete search history.

(56) References Cited

U.S. PATENT DOCUMENTS 7,413,318 B2 *  8/2008  Hsu .................... G02F 1/133608
362/97.1
8,568,012 B2 * 10/2013  Park .................. G02F 1/133603
362/612

(Continued)

FOREIGN PATENT DOCUMENTS

CN  1648741 A  8/2005
CN  1959492 A  5/2007
(Continued)

*Primary Examiner* — Ismael Negron
(74) *Attorney, Agent, or Firm* — Nathan & Associates; Menachem Nathan

(57) ABSTRACT

A display device includes a display panel and a backlight module. The backlight module includes a plurality of light sources arranged on a bottom plate, a plurality of lenses disposed on a light emission surface of the light sources, and a diffuser board is on the lens. The lens includes a lens body disposed on the light emission surface of the light source, and a supporting portion disposed between the lens body and the diffuser board. The lens body is configured to diffuse light from the light source, with the supporting portion configured to support the diffuser board.

10 Claims, 2 Drawing Sheets

(51) Int. Cl.
    *F21V 7/00*     (2006.01)
    *F21Y 115/10*     (2016.01)

(56) References Cited

U.S. PATENT DOCUMENTS

| | | | |
|---|---|---|---|
| 9,127,814 B2 * | 9/2015 | Nozawa | G02F 1/133608 |
| 11,054,688 B2 * | 7/2021 | Kwon | G02F 1/133603 |
| 2012/0105739 A1 * | 5/2012 | Shimizu | G02F 1/133603 |
| | | | 348/790 |
| 2013/0148329 A1 * | 6/2013 | Zhou | G02F 1/133603 |
| | | | 362/97.1 |
| 2020/0159071 A1 * | 5/2020 | Yoon | G02F 1/133603 |

FOREIGN PATENT DOCUMENTS

| | | | | |
|---|---|---|---|---|
| CN | 201004138 Y | | 1/2008 | |
| CN | 109163227 A | | 1/2019 | |
| CN | 109613757 A | * | 4/2019 | ......... G02F 1/13357 |
| CN | 109633980 A | * | 4/2019 | ......... G02F 1/13357 |
| CN | 109633980 A | | 4/2019 | |

* cited by examiner

DISPLAY DEVICE BACKLIGHT MODULE WITH LENSES HAVING SUPPORTING PORTIONS FOR DIFFUSER BOARD

FIELD OF INVENTION

The present invention relates to a display technology, especially to a backlight module and a display device.

BACKGROUND OF INVENTION

Direct lit light emitting diode (light-emitting diode, LED) backlight modules have two common embodiment forms, one directly employs surface mount type LEDs, and the form needs a large amount of LEDs. A second from employs surface mount type LEDs with secondary lenses, which reduces the amount of the LEDs.

No matter which embodiment form is adopted, the diffuser board in the backlight module needs a supporting structure to prevent deformation thereof due to thermal expansion or contract and vibration during transport and causing quality issue or damages to the LEDs.

However, a conventional supporting structure is disposed between the LEDs and is sheet-shaped. Temperature increase in a cavity of the backlight module during work of the LEDs, over high ambient temperature during transport, or vibration of the backlight module during the transport, will cause deformation of the supporting structure.

SUMMARY OF INVENTION

The present invention embodiment provides a backlight module and a display device to solve the technical issue that a supporting structure of a conventional backlight module is easily deformed.

The present invention embodiment provides a backlight module, comprising:
 a light source;
 a lens, disposed on a light emission surface of the light source; and
 a diffuser board, disposed on the lens;
 wherein the lens comprises a lens body and a supporting portion, the lens body is disposed on the light emission surface of the light source, the supporting portion is disposed between the lens body and the diffuser board; the lens body is configured to diffuse light of the light source, and the supporting portion is configured to support the diffuser board;
 wherein the lens body and the supporting portion are formed integrally together; and
 wherein the supporting portion is at least two; the at least two supporting portions are disposed evenly on a light emission surface of the lens body.

In the backlight module of the present invention, the lens body comprises the light emission surface, the light emission surface comprises a first light emission surface and a second light emission surface, the second light emission surface surrounds a periphery of the first light emission surface, the first light emission surface is a concave surface; and
 the supporting portion is disposed on the second light emission surface.

In the backlight module of the present invention, the lens body comprises the light emission surface, the light emission surface is a concave surface, the supporting portion is disposed on an edge of the light emission surface.

In the backlight module of the present invention, an outer surface of the supporting portion is a coarse surface.

In the backlight module of the present invention, the supporting portion is a conic structure.

In the backlight module of the present invention, the backlight module further comprises a bottom plate, and the light source is plural and the light sources are disposed on the bottom plate at intervals.

In the backlight module of the present invention, the light source is a light emitting diode (LED) lamp.

The present invention embodiment also provides a backlight module, comprising:
 a light source;
 a lens, disposed on a light emission surface of the light source; and
 a diffuser board, disposed on the lens;
 wherein the lens comprises a lens body and a supporting portion, the lens body is disposed on the light emission surface of the light source, the supporting portion is disposed between the lens body and the diffuser board; the lens body is configured to diffuse light of the light source, and the supporting portion is configured to support the diffuser board.

In the backlight module of the present invention, the lens body and the supporting portion are formed integrally together.

In the backlight module of the present invention, the supporting portion is at least two; the at least two supporting portions are disposed evenly on a light emission surface of the lens body.

In the backlight module of the present invention, the lens body comprises the light emission surface, the light emission surface comprises a first light emission surface and a second light emission surface, the second light emission surface surrounds a periphery of the first light emission surface, the first light emission surface is a concave surface; and
 the supporting portion is disposed on the second light emission surface.

In the backlight module of the present invention, the lens body comprises the light emission surface, the light emission surface is a concave surface, the supporting portion is disposed on an edge of the light emission surface.

In the backlight module of the present invention, an outer surface of the supporting portion is a coarse surface.

In the backlight module of the present invention, the supporting portion is a conic structure.

In the backlight module of the present invention, the backlight module further comprises a bottom plate, the light source is plural and the light sources are disposed on the bottom plate at intervals.

In the backlight module of the present invention, the light source is a light emitting diode (LED) lamp.

The present invention also relates to a display device, the display device comprises a display panel and a backlight module, the display panel is disposed on the backlight module.

The backlight module comprises:
 a light source;
 a lens, disposed on a light emission surface of the light source; and
 a diffuser board, disposed on the lens;
 wherein the lens comprises a lens body and a supporting portion, the lens body is disposed on the light emission surface of the light source, the supporting portion is disposed between the lens body and the diffuser board; the lens body is configured to diffuse light of the light source, and the supporting portion is configured to support the diffuser board.

In the display device of the present invention, the lens body and the supporting portion are formed together integrally.

In the display device of the present invention, the supporting portion is at least two; the at least two supporting portions are disposed evenly on a light emission surface of the lens body.

In the display device of the present invention, the lens body comprises the light emission surface, the light emission surface comprises a first light emission surface and a second light emission surface, the second light emission surface surrounds a periphery of the first light emission surface, the first light emission surface is a concave surface; and the supporting portion is disposed on the second light emission surface.

In the display device of the present invention, the lens body comprises the light emission surface, the light emission surface is a concave surface, the supporting portion is disposed on an edge of the light emission surface.

In the display device of the present invention, an outer surface of the supporting portion is a coarse surface.

In the display device of the present invention, the supporting portion is a conic structure.

In the display device of the present invention, the backlight module further comprises a bottom plate, and the light source is plural and the light sources are disposed on the bottom plate at intervals.

In the display device of the present invention, the light source is a LED lamp.

Compared to a conventional backlight module, the backlight module and the display device of the present invention combine the lens body and the supporting portion to form the lens, and dispose the supporting portion between the lens body and the diffuser board for supporting the diffuser board. Such configuration shortens a height of the supporting portion and improve supporting performance of the supporting portion, which solve the technical issue of easy deformation of the supporting structure of the conventional backlight module.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
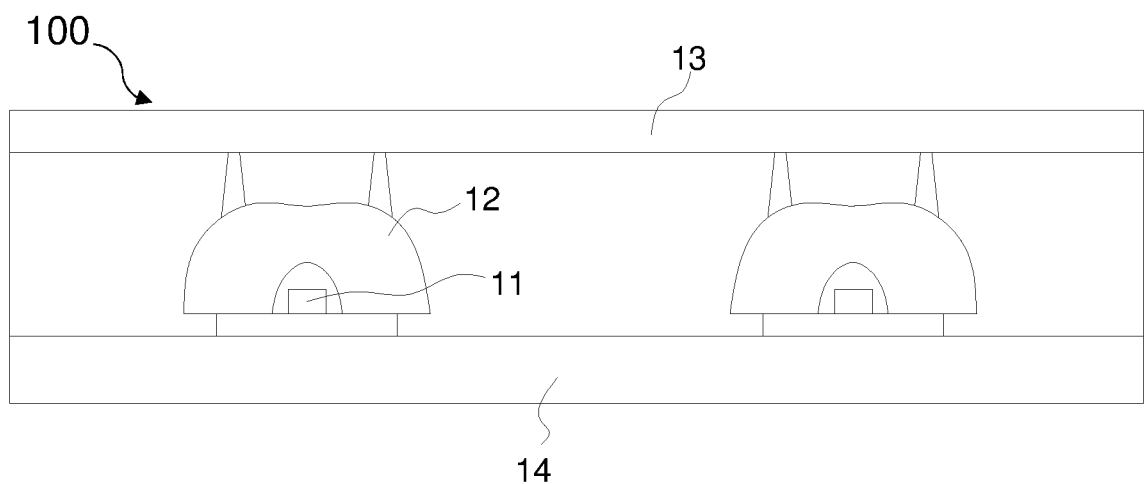
FIG. 1 is a schematic structural view of a backlight module of a first embodiment of the present invention.

Please refer to the drawings in the drawings, in which the same component symbols represent the same components.

The following description is based on the specific embodiments of the present invention, which should not be considered as limitation to other specific embodiments.

Figure 2:
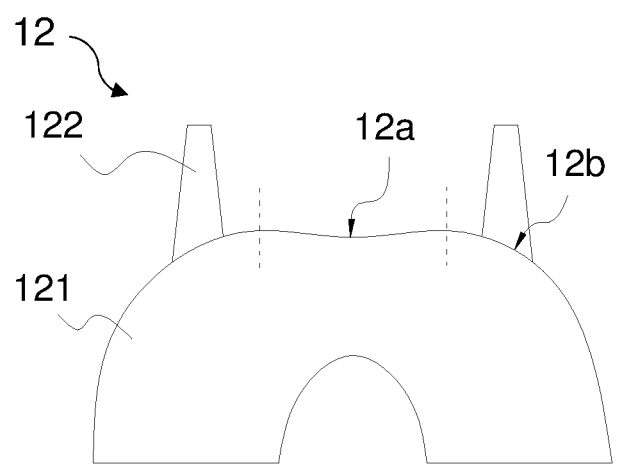
FIG. 2 is a schematic structural view of a lens of the first embodiment of the present invention.

With reference to FIGS. 1 and 2, FIG. 1 is a schematic structural view of a backlight module of a first embodiment of the present invention. FIG. 2 is a schematic structural view of a lens of the first embodiment of the present invention. The backlight module 100 of the first embodiment is a direct lit backlight module.

The backlight module 100 of the first embodiment of the present invention includes a light source 11, a lens 12, a diffuser board 13 and a bottom plate 14.

A plurality of light source 11 are disposed on the bottom plate 14 at intervals. Optionally, the light source 11 is a light emitting diode (LED) lamp, but is not limited hereto.

The lens 12 is disposed on a light emission surface of the light source 11. The diffuser board 13 is disposed on the lens 12.

The lens 12 include a lens body 121 and a supporting portion 122. The lens body 121 is disposed on the light emission surface of the light source 11. The supporting portion 122 is disposed between the lens body 121 and the diffuser board 13. The lens body 121 is configured to diffuse light from the light source 11. The supporting portion 122 is configured to support the diffuser board 13.

The backlight module 100 of the first embodiment combines the lens body 121 and the supporting portion 122 to form the lens 12, and disposes the supporting portion 122 between the lens body 121 and the diffuser board 13 for supporting the diffuser board 13. Such configuration reduces a height of the supporting portion 122 and improves supporting performance of the supporting portion 122.

Specifically, compared to the prior art, a height of the supporting portion 122 of the first embodiment is reduced. A reduced portion of the height is a distance from the light emission surface of the lens body 121 to the bottom plate 14. Because decrease of the height of the supporting portion 122, the supporting portion would not deform easily.

The backlight module 100 of the first embodiment also includes an optical film (not shown), and the optical film is disposed on the diffuser board 13.

The lens body 121 and the supporting portion 122 are formed integrally together. The two are formed in one time by a mold, which save steps in the process. In performance, stability of connection between the two is improved. Of course, the two can be separate parts and be connected to each other securely.

In the first embodiment, at least one supporting portion 122 is disposed. Because the supporting portion 122 is configured to support the diffuser board 13, the supporting portion 122 would suffer pressure from the diffuser board 13. However, when there is only one supporting portion 122, under the pressure of the diffuser board 13, the lens 12 is tilted due to receipt of uneven force, which results in deviation of the lens 12 from the light emission surface of the light source 11. To overcome the above shortage, the supporting portion 122 of the first embodiment is at least two. The at least two supporting portion 122 are disposed evenly on the light emission surface of the lens body 121.

In the first embodiment, the lens body 121 includes a light emission surface. The light emission surface includes a first light emission surface 12a and a second light emission surface 12b. The second light emission surface 12b surrounds a periphery of the first light emission surface 12a. The first light emission surface 12a is a concave surface. The supporting portion 122 is disposed on the second light emission surface 12b.

Specifically, the first light emission surface 12a is located on a middle region of the light emission surface of the lens body 121, and an amount of emitted light of the first light emission surface 12a is greater than an amount of emitted light of the second light emission surface 12b. Therefore, disposing the supporting portion 122 on the second light emission surface 12b increases light emitting performance of the backlight, and prevents excessive brightness of a light emitting region corresponding to the supporting portion 122 of the lens.

Furthermore, an outer surface of the supporting portion 122 is a coarse surface. Such configuration makes the surface of the supporting portion 122 have a light diffusing characteristic. In other words, when radiated on the surface of the supporting portion 122, light is diffused such that the light radiated on the supporting portion 122 is dispersed and the emitted light of the backlight is more even, which improves light emitting performance of the backlight.

Optionally, supporting portion 122 is a conic structure, but is not limited hereto. Because a top of the supporting portion 122 is closer to the diffuser board 13 in comparison to a bottom thereof, an effective of an amount of light received by the top of the supporting portion 122 to the light emission of the backlight is greater than that of an effective of an amount of light received by the bottom thereof to the light emission of the backlight. Therefore, the supporting portion 122 is a conic structure to reduce the amount of light radiation on the top of the supporting portion 122 and further to decrease effect of the supporting portion 122 to the backlight, which improves light emission effect of the backlight.

Figure 3:
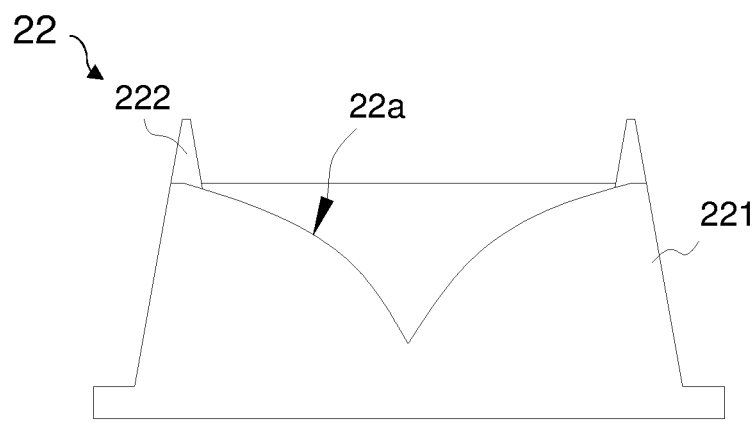
FIG. 3 is a schematic structural view of a lens of the backlight module of a second embodiment of the present invention.

With reference to FIG. 3, FIG. 3 is a schematic structural view of a lens of the backlight module of a second embodiment of the present invention. lens 22 includes a lens body 221 and a supporting portion 222. A difference of the second embodiment from the first embodiment is as follows.

The lens body 221 includes a light emission surface 22a. The light emission surface 22a is a concave surface. supporting portion 222 is disposed on an edge of the light emission surface 22a.

Other structures of the second embodiment refer to the contents of first embodiment and will not be repeatedly described herein.

Figure 4:
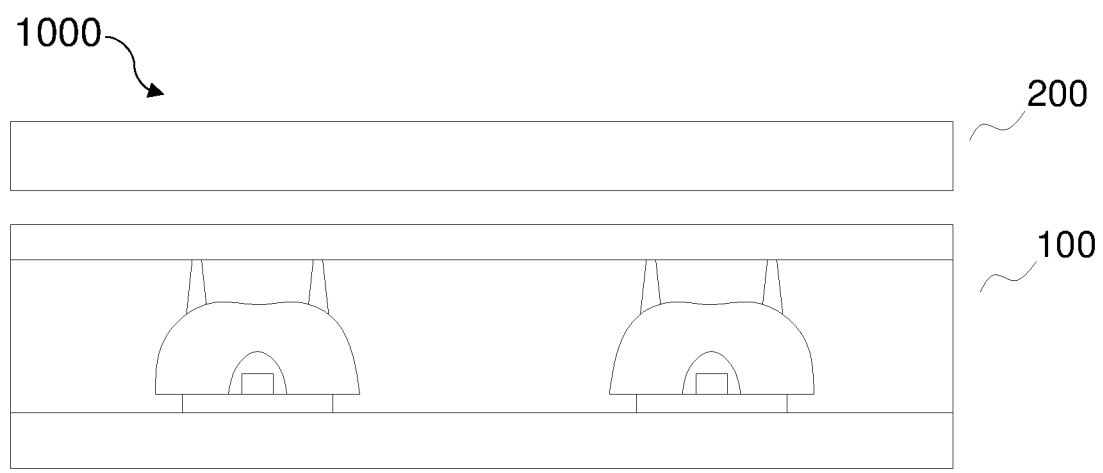
FIG. 4 is a schematic structural view of a display device of an embodiment of the present invention.

With reference to FIG. 4, FIG. 4 is a schematic structural view of a display device of an embodiment of the present invention. The display device 1000 of the present invention embodiment includes a display panel 200 and a backlight module 100.

A specific structure of the backlight module 100 of the display device 1000 of the present embodiment should refer to the second embodiment of the first embodiment and the backlight module of the second embodiment of the present invention, and will not be repeatedly described hereto.

Compared to a conventional backlight module, the backlight module and the display device of the present invention combine the lens body and the supporting portion to form the lens, and dispose the supporting portion between the lens body and the diffuser board for supporting the diffuser board. Such configuration shortens a height of the supporting portion and improve supporting performance of the supporting portion, which solve the technical issue of easy deformation of the supporting structure of the conventional backlight module.

As described above, for a person of ordinary skill in the art, variants and modifications can be made according to technical solutions and technical concepts of the present invention, and all of the variants and modifications should be within the scope of claims of the present invention.

What is claimed is:

1. A backlight module, comprising:
   a light source;
   a lens, disposed on a light emission surface of the light source; and
   a diffuser board, disposed on the lens;
   wherein the lens comprises a lens body and a supporting portion, the lens body is disposed on the light emission surface of the light source, the supporting portion is disposed between the lens body and the diffuser board; the lens body is configured to diffuse light of the light source, and the supporting portion is configured to support the diffuser board;
   wherein the lens body comprises a light output surface, the light output surface comprises a first light output surface and a second light output surface, the second light output surface surrounds a periphery of the first light output surface, the first light output surface is a concave surface;
   wherein the supporting portion is disposed on the second light output surface; and
   wherein an outer surface of the supporting portion is a coarse surface.

2. The backlight module as claimed in claim 1, wherein the lens body and the supporting portion are formed integrally together.

3. The backlight module as claimed in claim 1, wherein the supporting portion is at least two; the at least two supporting portions are disposed evenly on the light output surface of the lens body.

4. The backlight module as claimed in claim 1, wherein the supporting portion is a conic structure.

5. The backlight module as claimed in claim 1, wherein the backlight module further comprises a bottom plate, the light source is plural and the light sources are disposed on the bottom plate at intervals.

6. The backlight module as claimed in claim 1, wherein the light source is a light emitting diode (LED) lamp.

7. A backlight module, comprising:
   a light source;
   a lens, disposed on a light emission surface of the light source; and
   a diffuser board, disposed on the lens;
   wherein the lens comprises a lens body and a supporting portion, the lens body is disposed on the light emission surface of the light source, the supporting portion is disposed between the lens body and the diffuser board; the lens body is configured to diffuse light of the light source, and the supporting portion is configured to support the diffuser board;
   wherein the lens body and the supporting portion are formed integrally together; and
   wherein the supporting portion is at least two; the at least two supporting portions are disposed evenly on a light output surface of the lens body;
   wherein the light output surface comprises a first light output surface and a second light output surface, the second light output surface surrounds a periphery of the first light output surface, the first light output surface is a concave surface;
   wherein the supporting portion is disposed on the second light output surface; and
   wherein an outer surface of the supporting portion is a coarse surface.

8. The backlight module as claimed in claim 7, wherein the supporting portion is a conic structure.

9. The backlight module as claimed in claim 7, wherein the backlight module further comprises a bottom plate, and the light source is plural and the light sources are disposed on the bottom plate at intervals.

10. The backlight module as claimed in claim 7, wherein the light source is a light emitting diode (LED) lamp.

* * * * *